United States Patent [19]
Cayce

[11] Patent Number: 5,400,607
[45] Date of Patent: Mar. 28, 1995

[54] SYSTEM AND METHOD FOR HIGH-EFFICIENCY AIR COOLING AND DEHUMIDIFICATION

[76] Inventor: James L. Cayce, 103 Pine Crest, Longwood, Fla. 32750

[21] Appl. No.: 219,954

[22] Filed: Mar. 30, 1994

Related U.S. Application Data

[63] Continuation of Ser. No. 86,125, Jul. 6, 1993, Pat. No. 5,309,725.

[51] Int. Cl.[6] .............................................. F25D 17/06
[52] U.S. Cl. .......................................... 62/90; 62/173
[58] Field of Search ...................... 62/90, 173, 176.5; 165/21

[56] References Cited

U.S. PATENT DOCUMENTS

| | | | |
|---|---|---|---|
| 1,837,798 | 12/1931 | Shipley | 62/90 X |
| 3,831,664 | 8/1974 | Pogson | 165/8 C |
| 3,916,644 | 11/1975 | Nasser | 62/428 |
| 4,025,326 | 5/1977 | Leonard | 62/175 |
| 4,271,678 | 6/1981 | Liebert | 62/173 |
| 4,557,116 | 12/1985 | Kittler | 62/238.6 |
| 4,607,498 | 8/1986 | Dinh | 62/185 |
| 4,827,735 | 5/1989 | Dinh | 62/90 |
| 4,942,740 | 7/1990 | Shaw et al. | 62/93 |
| 4,971,139 | 11/1990 | Khatter | 165/86 |
| 5,228,302 | 7/1993 | Eiermann | 62/90 |
| 5,309,725 | 5/1994 | Cayce | 62/90 |

Primary Examiner—William E. Wayner
Attorney, Agent, or Firm—Allen, Dyer, Doppelt, Franjola & Milbrath

[57] ABSTRACT

The system in the present invention is an outside air ventilation cooling and room dehumidification system for use in commercial HVAC applications. The system includes a high-efficiency air filter, chilled water or evaporator precooling coil, a refrigeration compressor, an evaporator coil, a heat exchanger for removing heat and moisture from the air entering the evaporator coil and supplying heat to the air leaving the evaporator coil, a condenser coil located in the discharge airstream that reheats the air, and a fan to move the air through the coils. The heat exchanger can be a phase-change heat-pipe-type heat exchanger; a water cooling/heating coil "runaround loop"; an air-to-air plate-type heat exchanger; or a rotary heat exchanger.

23 Claims, 6 Drawing Sheets

SYSTEM AND METHOD FOR HIGH-EFFICIENCY AIR COOLING AND DEHUMIDIFICATION

This is a continuation of application Ser. No. 08/086,125, filed on Jul. 6, 1993, U.S. Pat. No. 5,309,725.

FIELD OF THE INVENTION

This invention relates to systems and methods for air conditioning and dehumidification, and particularly to efficient commercial systems and methods utilizing outside air ventilation.

BACKGROUND OF THE INVENTION

It is a common problem in buildings that high humidity occurs as a direct result of the inability of the building's air conditioning system to remove the humidity from the space. Additionally, there are many facilities with air conditioning systems that do not provide sufficient outside air ventilation to relieve the common problems of carbon dioxide buildup, airborne pollutants, and stale odors that frequently occur. When combined in a building, these conditions can result in problems such as mold, mildew, spores, dust mites, high carbon dioxide concentrations, and the presence of various other noxious or undesirable gases and odors, all of which can create health problems for the building's occupants. Recent media attention to facilities with these problems has led to their being classified as "sick buildings."

These "sick building" problems can be further exacerbated by certain general design criteria implemented by the air conditioning industry. For example, most modern air conditioning systems are designed to provide very high efficiencies in accordance with ever-increasing demands for operating cost savings. However, these high efficiencies are often obtained at the expense of the ability of the air-conditioning system to achieve moisture removal from the air, resulting in high humidity levels in the building. As a result of this type of manufacturing design philosophy, the occupants of a building having such a system will often lower the temperature setting of the thermostat in an effort to reduce the humidity in the space. This causes the air conditioning system to run for longer periods of time, increasing the operating cost of the air conditioning system and resulting in the temperature in the space becoming very cold. The net effects are a very cold, clammy (i.e., high humidity) building space having high operating costs.

One conventional solution to this problem is the use of reheat, that is, the addition of heat to the air after it has been cooled. This is done in an attempt to prevent the space from being overcooled and to obtain better control over the humidity. A negative aspect of reheat, however, is that it causes high operating costs because not only must the space load be cooled, but also the reheat load must be cooled, in effect increasing the total cooling load and the power consumed to meet this cooling requirement.

There have been many different approaches to resolving these problems utilizing energy recovery techniques, passive heat transfer, and even different coil arrangements in standard air conditioning equipment. One such example is shown in U.S. Pat. No. 4,557,116 issued to Kittler, which teaches a dehumidifier system for indoor swimming pools using heat recovery of the refrigeration compressor heat, recovered by positioning the condenser coil in the discharge air stream and reheating the air cooled in the dehumidification coil in an effort to provide reheat without additional operating costs. This approach works very well for enclosed pool environments because the discharge air temperature is approximately 100° F. However, because the air is so warm, this system is unlikely to work efficiently in comfort air conditioning applications because Of the large heat load resulting from introducing 100° F. air into the air conditioning system. Additionally, Kittler's unit is not designed to provide any outside air ventilation cooling to the space, as it only addresses the humidity control aspect and not the fresh air ventilation or the temperature control of the air supplied to the space.

Another technique disclosed by Dinh, in U.S. Pat. No. 4,607,498, employs a heat pipe phase-change heat exchanger in combination with an evaporator coil, with a precooling coil and a reheat coil placed immediately upstream and downstream of a conventional vapor compression cycle air conditioner evaporator coil, respectively. This system can be a very effective retrofit application for dehumidification. The addition of a heat pipe heat exchanger to an existing evaporator coil has the effect of cooling the air approximately 8° F. by the heat pipe precooling coil prior to introduction to the evaporator coil; this reduces the load slightly on the evaporator coil and allows that coil to cool the air approximately 2° F. more than normal in an effort to remove more moisture from the air and provide better dehumidification of the space. The air leaving the evaporator coil is then reheated by the heat pipe reheat coil by the same amount of precooling, approximately 8° F., so that the air is not too cold when introduced into the space being cooled.

The particular approach disclosed by Dinh may require additional system modifications, however. Because the air being introduced to the space is now warmer due to the effect of the heat pipe, the supply air fan and duct system may require upgrading to increase the supply air flow and maintain the design space temperature.

The efficiency gains produced by the Dinh system from the precooling may be offset by the increased cooling work performed by the evaporator coil in cooling the air to lower temperatures. Additionally, the warmer discharge air temperature caused by the heat pipe reheat coil may result in a larger air flow requirement to handle the sensible cooling load, possibly causing an increase in the fan horsepower requirement. The heat pipes also add static pressure loss to the system that the fan must overcome, again possibly increasing the fan horsepower requirement.

The approach disclosed by Dinh locates the heat pipe as the first coil in the entering air stream of the air conditioning system and thus exposes it to widely varying entering air conditions as the seasons and temperatures change, causing variations in the heat pipe performance. For example, at part load conditions the air entering the first coil of the heat pipe may now be 68°-70° F. or possibly even colder in the winter instead of the 78°-80° F. designed for in the summer. Under these new conditions, the heat pipe may not provide as much precooling and reheating as would be desired, and may possibly reduce the overall dehumidification below that required.

Another type of system that has been used in the Melbourne, Fla. area for several years is a two-stage refrigeration device, called a "latent machine." This design uses two stages of a conventional vapor compression refrigeration cycle with heat recovery to cool the room air to a temperature low enough to maintain the desired humidity control in the space and reheats the air back to room temperature. The process embodied in this design is to cool the room air to 52° F. saturated conditions in the first stage of refrigeration. The heat is rejected to the outdoors via a standard condenser arrangement, and the air is then further cooled to 37° F. saturated conditions in the second stage of refrigeration, then reheated to 75° F. dry bulb, 55° F. wet bulb using a conventional condenser coil in the unit supply air stream that transports the heat of rejection from the second stage of refrigeration into the supply air. The air is thus reintroduced to the room as dehumidified, room temperature air that provides latent cooling only.

This "latent machine" system has proven to be excellent for humidity control and is very efficient on return air systems. It does, however, sacrifice some efficiency on outside air applications in that large amounts of energy are required when used with a supply of warmer and more humid air from the outside.

Another previous system, known as the "Tricoil System" of The Sensible Equipment Company of Orlando, Fla., utilizes a water-based coil "runaround loop." In this system, a water-cooled precooling coil is placed in the entering air prior to an evaporator coil, then a water-heated reheat coil is placed in the air leaving the evaporator coil, with the water recirculated between the precool and reheat coils with a small pump, in effect providing a heat transfer mechanism similar to the heat pipe. This system has the same advantages of the Dinh system with regard to humidity control and system efficiency and can again be a very simple and effective retrofit method for an oversized room air conditioner. The system does allow for a variable amount of reheat to be added to the system for part load humidity control and requires a separate heat source to introduce a false load on the air conditioning system so as to maintain proper dehumidification with some increased operating costs.

It is therefore a desirable objective to provide control of room humidity without the use of reheat, without overcooling the space, and without sacrificing the efficiency of the air conditioning system.

It is also desirable to provide control of the room humidity regardless of the temperature in the space or outside and regardless of the solar load.

Another desirable objective would be to provide adequate outside air for ventilation to benefit occupant health and maintain lower levels of airborne pollutants and fresher air in the building per the latest standards of the air conditioning industry, the American Society of Heating, Refrigeration, and Air Conditioning Engineers (ASHRAE) Standard 62-1989.

It is also a desirable objective to provide all of these aspects in one system: proper control over the supply and cooling of outside air ventilation, space dehumidification, and high efficiency. Such control would ensure that the building would be maintained in proper operating condition at all times.

It was in an effort to achieve these objectives that the present invention has evolved.

SUMMARY OF THE INVENTION

This invention is directed to a system and method for air cooling and dehumidification primarily for use in commercial, institutional, and industrial buildings, and is intended to provide a highly efficient system for supplying outside ventilation air cooling and space humidity control. In the system and method of this invention, the above-stated desirable objectives are achieved by combining passive heat transfer technology, heat recovery, and strategic refrigeration techniques to maximize the benefit of each technique, while addressing humidity control and fresh air ventilation cooling only.

In the present invention, a heat exchanger arrangement is utilized for passive heat transfer, and is presented in a multistep system wherein the heat exchanger is located in a position that reduces the cooling required of the evaporator coil, thus reducing the work performed by the compressor and making the system more efficient. The types of passive heat transfer heat exchangers that may be used in this invention are heat pipes, precool/reheat water-based coil runaround loops, air-to-air plate-type heat exchangers, and rotary heat exchangers. In the case of any of these passive heat transfer systems, the work required on the part of the compressor is reduced by the amount of work performed in the heat exchanger. In effect, in the system of method of this invention, the air is cooled in multiple steps as well as precooling the air prior to the evaporator coil, thereby reducing the cooling load on the coil. The heat is then transferred back into the airstream after the air has been cooled by the evaporator coil, thus serving as a heat source for reheating the air. As a consequence of this arrangement, the amount of electrical energy required by the unit is substantially reduced, while permitting the dehumidified fresh ventilation air to be supplied at room comfort conditions, thus preventing overcooling of the space.

In its preferred embodiment, the system and method described herein provides humidity control and proper fresh air ventilation to the space through the use of two stages of cooling by refrigeration, two steps of passive heat transfer technology, and one step of heat recovery. In accordance with this invention, 42° F. dew point air at room temperature is achieved, and the amount of energy expended to achieve this is the amount of energy required by the system. Accordingly, the steps taken to reduce energy consumption provide increased efficiency. Regarding the design of the invention, at least two compressors are utilized to bring humidity and temperature down from a high of 93° F. dry bulb, 80° F. wet bulb, down to 42° F. dry bulb, 42° F. wet bulb. Therefore, with the use of passive heat transfer technology and heat recovery the discharge air temperature of the unit is warmed to 75° F., 42° F. dew point, achieving an energy-saving system.

The multistep arrangement that is the essence of this system is configured as follows: a cooling step; a first passive heat exchange step (cooling); a vapor compression cycle air conditioning step, the components of this part of the system comprising an evaporator coil, a condenser coil (reheat), and a refrigeration compressor, all in closed-loop fluid communication; and a second passive heat exchange step (reheat).

The system can be enclosed, in which case air flow from component to component channeled by the enclosure, or it could be modular, with duct work serving to channel the air. At the upstream end air enters from the outside, from the building space, or from a mixture of the two sources, through admitting means; at the downstream end means are provided for air to exit and to be channeled to the building space. Air flow is created through the system by, for example, a fan and fan motor.

Component control is achieved with the use of sensors positioned at various points in the system: (1) a first sensing means, comprising a temperature and humidity sensor at the upstream end; (2) a second sensing means comprising a temperature sensor downstream of the first cooling step; (3) a third sensing means, comprising a humidity sensor downstream of the condenser coil; and (4) a fourth sensing means, comprising a temperature and humidity sensor located in the building space being served. A fifth sensor in the building space may also be used to detect carbon dioxide levels.

The sensors all send signals to a central control unit a preset level of $CO_2$ in the room.

The air has now been dehumidified sufficiently to remove the humidity generated by the occupants in the space, but is very nearly which controls the first cooling component, the vapor compression cycle air conditioner, and the air flow generator. Control parameters are determined from desired building space settings input into the control unit either directly or from a remote site. In an alternate embodiment, separate controllers could be provided for each parameter.

The fifth sensor can be used in concert with the admitting means for outside and return air flow, whereby carbon dioxide levels in the building space modulate via the control unit the relative amounts of outside and return air channeled through the system and, ultimately, to the building space.

In terms of energy consumption, low-efficiency prior art systems typically utilize 1.5 kW/ton to achieve 70° F. and 45% humidity; high-efficiency prior art systems typically utilize less than or approximately 1 kW/ton to achieve 70° F. and 60% humidity. In contrast, the system and method disclosed herein utilizes 0.8 kW/ton to achieve 70° F. and 45% humidity.

It is therefore a primary object of the invention to furnish a dehumidification and Outside air ventilation cooling system that provides accurate humidity control regardless of indoor or outdoor temperature or humidities and regardless of the solar load.

It is another important object of the invention to provide a dehumidification and outdoor air ventilation cooling system that is highly efficient.

It is another object of the invention to achieve an appropriate separation of the dehumidification process from the cooling process so that one of these can be accomplished to a selected degree apart from the other.

It is still another object of the invention to provide a system that will efficiently deliver properly dehumidified air at a desirable temperature to a room of an occupied building without involving an unnecessary reduction in the temperature of the air, which is typically caused by the need to run the air conditioning system primarily in order to achieve humidity control.

It is still another object of the invention to provide an overall air conditioning system having a novel and considerably improved dehumidifying characteristic.

It is another object of the invention to provide an outside air ventilation system that meets the latest industry standards for outside air ventilation to reduce the problems caused by poor indoor air quality.

It is yet another object of the invention that the dehumidification performed is sufficient to maintain a relative humidity of 45% in an occupied space when the space temperature is maintained at 75° F. by an independent air conditioning system that performs sensible cooling only.

These and other objects, features, and advantages of the system and method of the present invention will be more apparent from a study of the appended drawings and the detailed description set out below.

DETAILED DESCRIPTION OF THE PREFERRED EMBODIMENT

The invention will now be discussed with reference to FIGS. 1–6.

In the preferred embodiment, the outside air ventilation cooling and room dehumidification system is enclosed within a six-walled container (shown in FIG. 6), and the air flow proceeds from component to component channeled by the enclosure.

Figure 1:
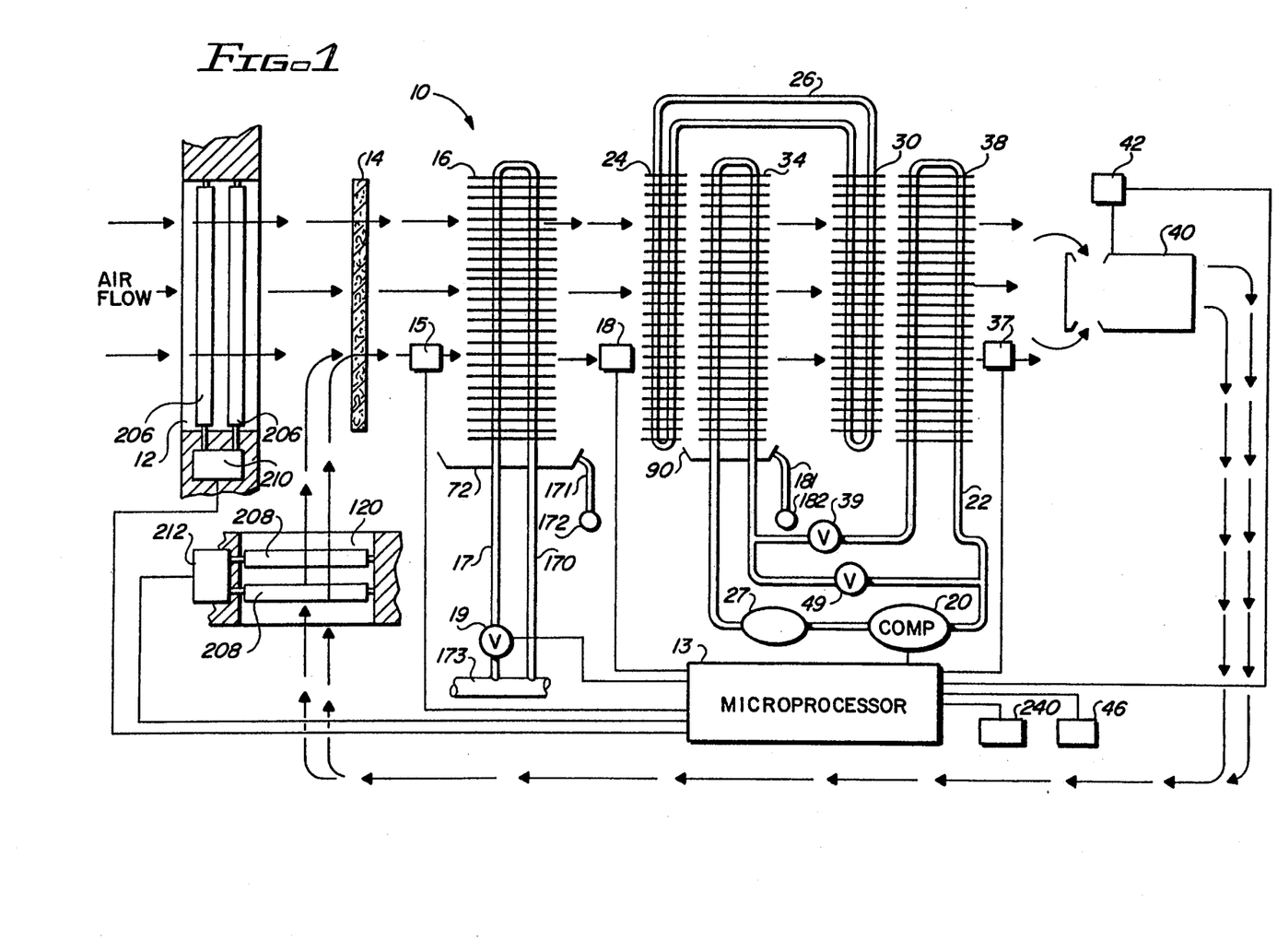
FIG. 1 is a schematic of the outside air ventilation cooling and room dehumidification system, showing the use of a chilled water coil as the precooling coil and a heat pipe as the passive heat exchanger device.

FIG. 1 is a schematic diagram of the outside air ventilation cooling and room dehumidification system, which is referred to generally by reference number 10. Through air inlets 12 and 120 outside and return air enters, respectively, then passes through filters 14, which remove airborne particles of dust, lint, and other such debris. By way of example, the filters 14 are 4-inch-thick, 40% minimum efficiency grade.

The incoming air then passes across dewpoint sensor 15, which measures the temperature and humidity and sends an analog signal to system microprocessor controller 13. Microprocessor 13 measures this input signal, calculates an equivalent enthalpy for the conditions measured, and operates the system accordingly, locking out all cooling functions below a dewpoint temperature of 48° F., and allowing all cooling and dehumidification functions above a dewpoint temperature of 48° F.

The air next passes over a finned tube chilled water precooling coil 16, which cools the incoming air from a maximum entering air condition of 93° F. dry bulb, 80° F. wet bulb (reference Point A on the psychometric chart depicted in FIG. 5) to 54.6° F. dry bulb, 54.4° F. wet bulb (Point B, FIG. 5) when supplied with chilled water from a chilled water source 173 entering at 48° F. and leaving at 59.2° F. through pipe 17 at coil inlet 302 and through draining means 170 via a coil outlet 304, respectively, forming a closed loop with the chilled water source 173. The chilled water flow through the coil is metered by a motorized, modulating control valve 19, which is modulated by an analog signal from microprocessor 13 in response to an analog signal from temperature sensor 18, which is located on the air discharge side of coil 16, to the microprocessor 13. This allows the flow of water to be reduced when the incoming air is cooler than the maximum design conditions (i.e., 93° F. dry bulb), while maintaining the required temperatures for air leaving the coil 16, as listed above. The condensate removed from the air in coil 16 is collected in condensate drain pan 72, positioned beneath coil 16, where it is then sent via pipes 171 to drain 172.

Figure 2:
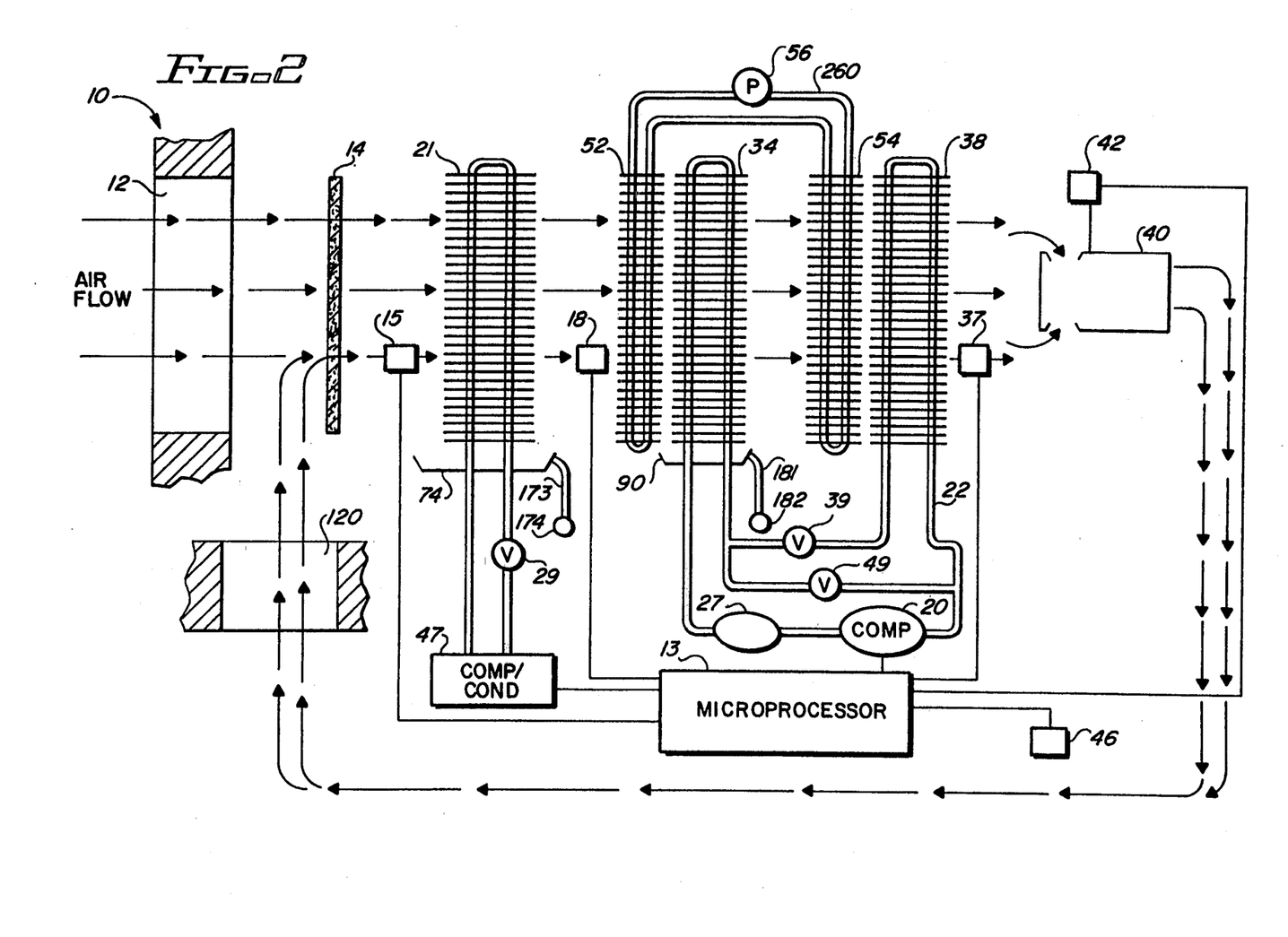
FIG. 2 is a schematic of the outside air ventilation cooling and room dehumidification system, showing the use of an evaporator coil as the precooling coil and a water-based runaround loop as the passive heat exchanger device.

In an alternate embodiment, shown in FIG. 2, an evaporator coil 21 is used for the precooling of the incoming air, which cools the incoming air from the maximum entering air condition of 93° F. dry bulb, 80° F. wet bulb (Point A, FIG. 5) to 54.6° F. dry bulb, 54.4° F. wet bulb (Point B, FIG. 5) when supplied with fluorinated hydrocarbon refrigerant, which, in this embodiment, is a refrigerant known as Freon R-22, at 38.4° F. saturated suction temperature. The cooling performed in evaporator coil 21 is controlled by a thermal expansion valve 29, which meters the refrigerant flow through the coil based on leaving refrigerant superheat, with 15° F. of superheat as the design criterion. Compressor/condenser unit 47 is cycled by microprocessor 13 in response to an analog signal from temperature sensor 18 located on the air discharge side of coil 21 to microprocessor 13. This allows the compressor to be cycled when the incoming air is cooler than the maximum design conditions, while maintaining the required coil leaving temperatures listed above. The condensate removed from the air in coil 21 is collected in condensate drain pan 74, where it is then piped to drain 174 via pipes 173.

Returning to the downstream side of FIGS. 1 and 2, it can be seen that evaporator coil 34 and condenser coil 38 are integral parts of a self-contained vapor compression cycle air conditioning system. By means of hermetic compressor 20, the refrigerant is pumped through pipes 22 to condenser coil 38, then to thermal expansion valve 39, evaporator coil 34, to suction accumulator 27 (used to prevent refrigerant liquid flooding of the compressor 20), and back to compressor 20.

The refrigeration circuit also employs a pressure-actuated hot gas bypass valve 49 that serves to maintain a constant suction temperature at the discharge of the evaporator coil 34 by bypassing a partial stream of the hot compressor discharge gas around thermal expansion valve 39 and thus falsely loading evaporator coil 34. This maintains a fairly constant coil leaving air temperature even under part load or reduced load conditions, reflected by lower than normal coil entering air temperatures.

Operation of the compressor 20 is controlled by a digital signal from microprocessor 13, being cycled by microprocessor 13 in response to an analog signal from a dewpoint sensor 46 located in the room being dehumidified. This allows compressor 20 to be cycled when the room air humidity is lower than the minimum design conditions. On systems requiring more accurate humidity control, compressor 20 is modulated between two different speeds by microprocessor 13, and on systems that require exact humidity control, microprocessor 13 controls the speed of compressor 20 with a variable-speed drive in response to the room humidity. Dewpoint sensor 37 measures the discharge air conditions of the unit, providing indication of the system's performance for verification of system operation.

Figure 5:
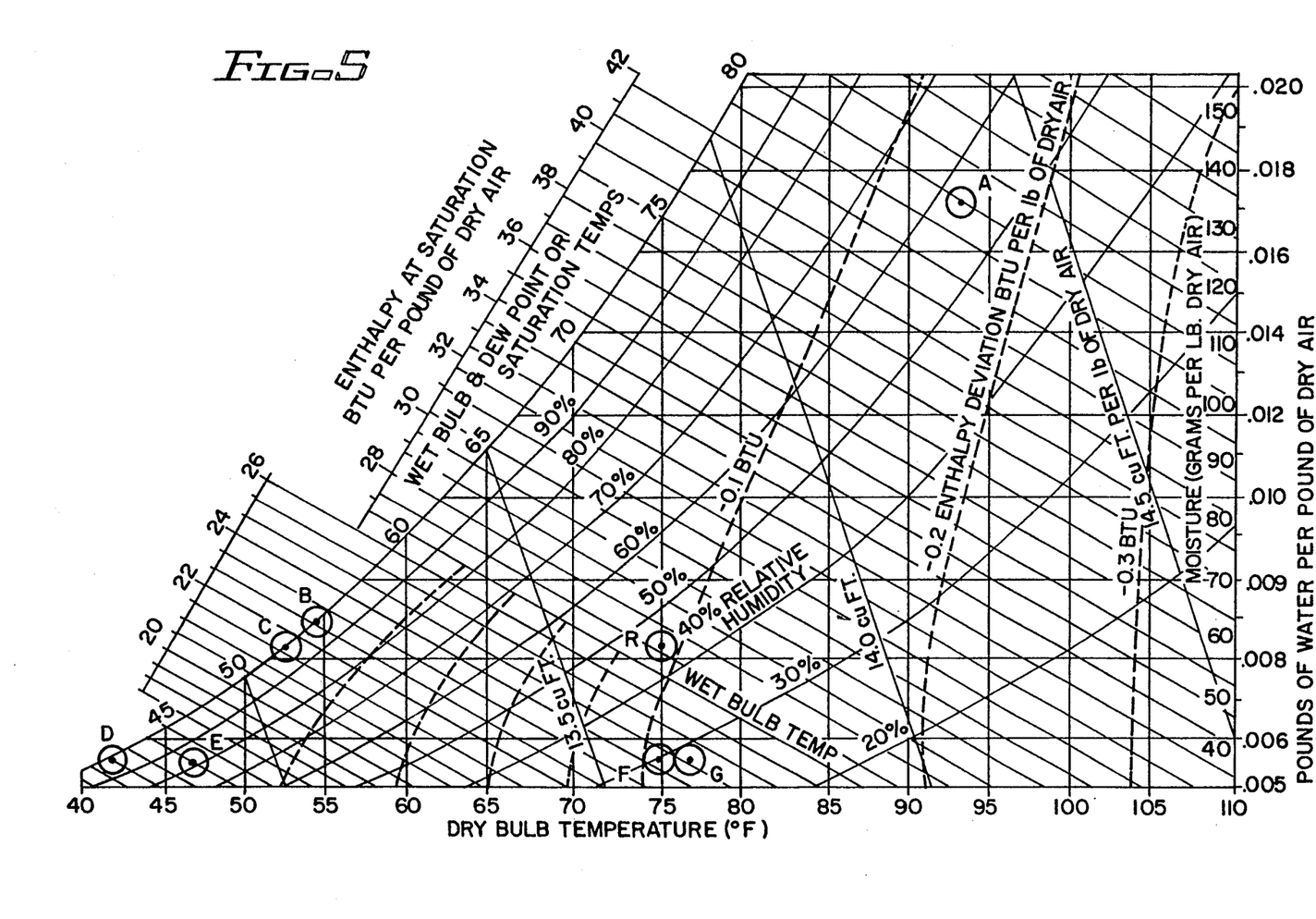
FIG. 5 is an annotated psychometric chart indicating points reached at each stage of the system.
Figure 6:
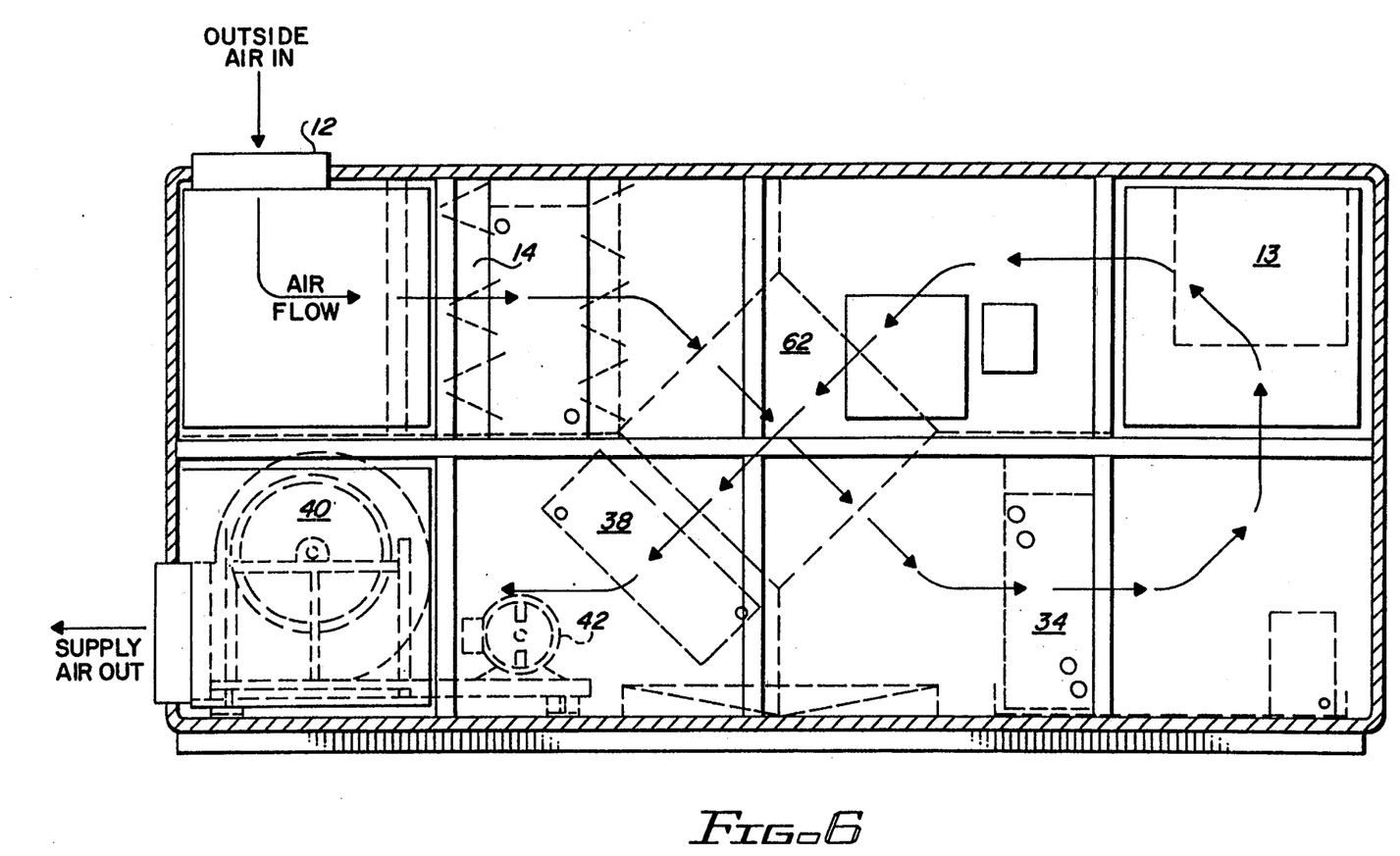
FIG. 6 is a schematic of the outside air ventilation cooling and room dehumidification system, indicating how one embodiment, utilizing the air-to-air heat exchanger, may be situated in a portable enclosure.

Referencing FIG. 1 again, subsequent to passing temperature sensor 18, the incoming air next passes over a finned tube fluid-to-fluid heat pipe heat exchanger precooling coil 24, where the air is cooled to 52.5° F. dry bulb, 52.3° F. wet bulb (Point C, FIG. 5). It is to be noted that these temperatures correspond to a dewpoint of 52.4° F., which is the desired dewpoint of the space at 75° F. dry bulb, 45% relative humidity space conditions (Point R, FIG. 5). Cooling the outside air to these temperatures equalizes the humidity of the incoming air to the humidity in the space, allowing this air to be introduced into the space without adding any humidity to the space, in effect "neutralizing" the outside air. The heat pipe precooling coil 24 is connected by piping 26 to the heat pipe reheat coil 30. Heat pipes 24 and 30 consist in the preferred embodiment of 1" OD aluminum tubes with extruded aluminum fins and contain an integral wick structure to assist in refrigerant flow inside the tubes. The design of heat pipes 24 and 30 allows for boiling and condensing of refrigerant inside the tubes, which is caused by the temperature difference of the air between the cooling and reheat coils, and no compressor is needed to pump refrigerant between the two heat pipes 24 and 30.

Referencing FIG. 2 again, subsequent to leaving temperature sensor 18, the incoming air alternately passes over a finned tube water-based coil "runaround" loop cooling coil 52, where the air is cooled to 52.5° F. dry bulb, 52.3° F. wet bulb (Point C, FIG. 5). "Runaround" cooling coil 52 is connected by piping 260 to "runaround" reheat coil 54. The water used to transfer the heat between these two coils is pumped through pipes 260 by circulating pump 56. Following evaporator coil 34, the incoming air then passes over "runaround" loop reheat coil 54, where the heat previously removed from the air in cooling coil 52 is returned to the air and the air is sensibly heated to 46.4° F. dry bulb, 44° F. wet bulb (Point E, FIG. 5).

Figure 3:
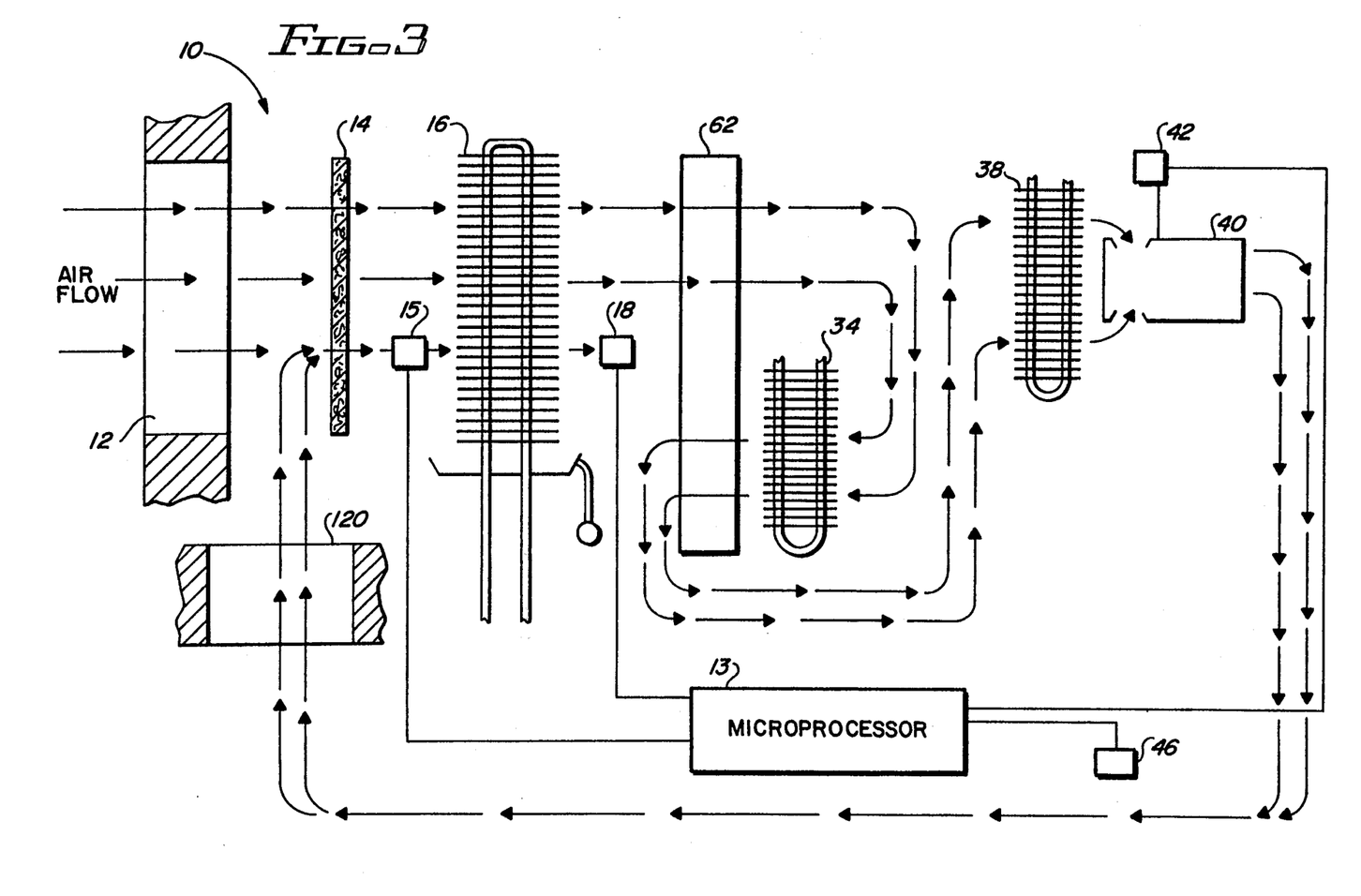
FIG. 3 is a schematic of the outside air ventilation cooling and room dehumidification system, showing the use of an air-to-air plate-type heat exchanger as the passive heat exchanger device.

In the embodiment shown in FIG. 3, subsequent to passing temperature sensor 18, the incoming air alternately passes over one side of the surface of a plate-type air-to-air heat exchanger 62, where the air is cooled to 52.5° F. dry bulb, 52.3° F. wet bulb (Point C, FIG. 5), and then out the second side. The cooling performed in this heat exchanger is accomplished by directing the cooled air from evaporator coil 34 to the third side of the surface of the plates of the heat exchanger. The incoming air then passes out the fourth side of the surface of plate-type heat exchanger 62, where the heat previously removed from the air in the cooling pass is returned to the air and the air is sensibly heated to 46.4° F. dry bulb, 44° F. wet bulb (Point E, FIG. 5).

Figure 4:
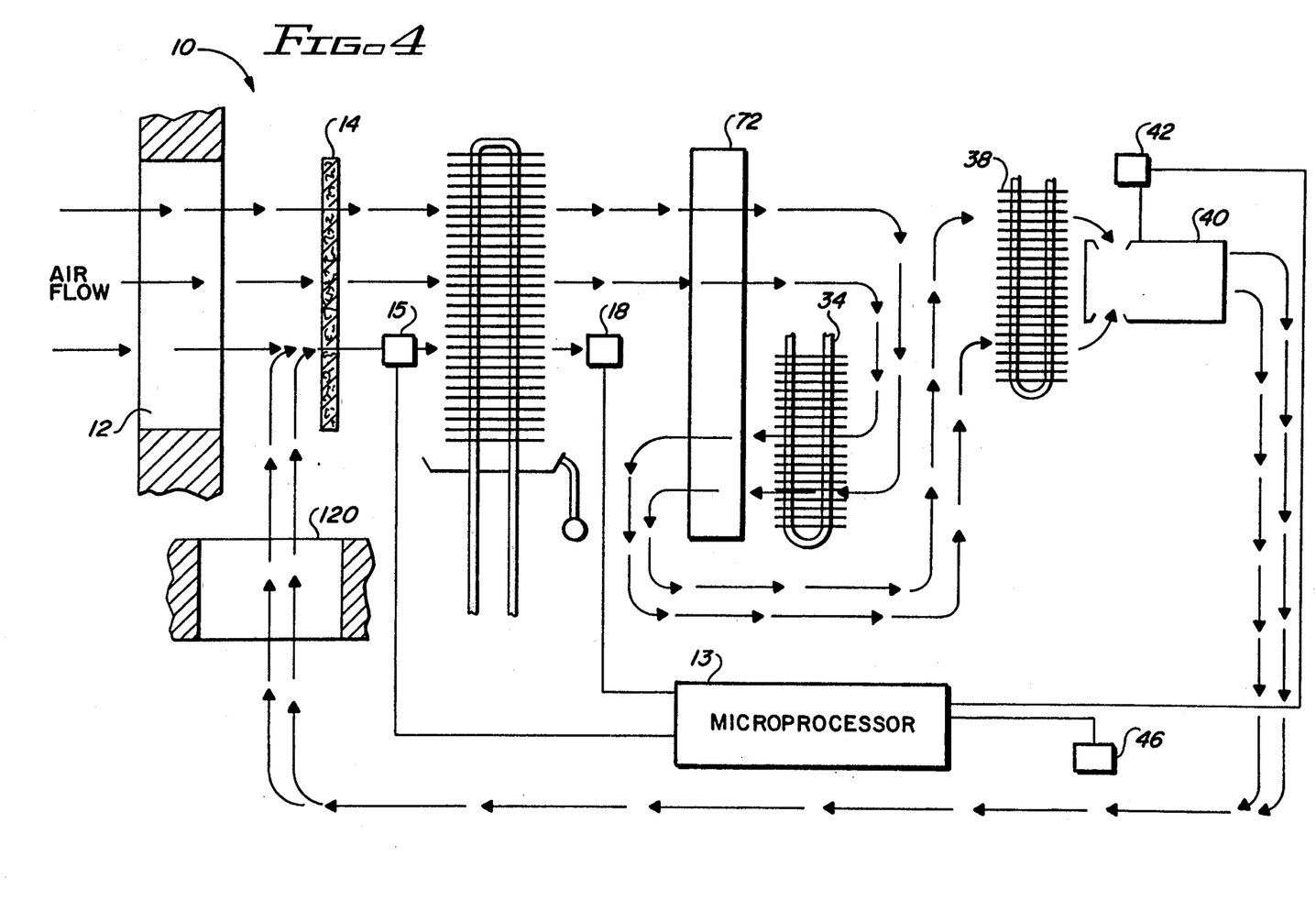
FIG. 4 is a schematic of the outside air ventilation cooling and room dehumidification system, showing the use of a rotary "heat wheel" heat exchanger as the passive heat exchanger device.

In another embodiment illustrated in FIG. 4, subsequent to passing temperature sensor 18, the incoming air alternately passes through half of a rotary "heat wheel" heat exchanger 72, where the air is cooled to 52.5° F. dry bulb, 52.3° F. wet bulb (Point C, FIG. 5), by passing into a first side and out a second side. The cooling performed in heat exchanger 72 is accomplished by directing the cooled air from evaporator coil 34 to the other half of heat exchanger 72, the air proceeding into the second side and out the first side, where the heat previously removed in the cooling pass is returned to the air and the air is sensibly heated to 46.4° F. dry bulb, 44° F. wet bulb (Point E, FIG. 5).

Referencing FIGS. 1 and 2, subsequent to leaving the precooling section of the heat exchanger, the air next passes over finned tube evaporator coil 34 of a conventional vapor compression cycle air conditioning system, where the air is further cooled to 42° F. dry bulb, 42° F. wet bulb (Point D, FIG. 5). The cooling performed in evaporator coil 34 is controlled by thermal expansion valve 39, which meters the refrigerant flow through the coil based on leaving refrigerant superheat, with 15° F. of superheat as the design criterion. The moisture condensed from the air being cooled in the evaporator coil 34 is collected in condensate pan 90, where it is then piped 181 to drain 182.

The air proceeds further across the reheat section of the heat exchanger, 30 and 54 in FIGS. 1 and 2, respectively, where it is reheated as described above.

The air then proceeds further across finned tube condenser coil 38, where the heat of compression of the refrigeration cycle is rejected to the air stream, heating the air to 75° F. dry bulb, 56.8° F. wet bulb (Point F, FIG. 5).

In all embodiments, the air finally passes fan 40, driven by fan motor 42, which propels the air through the unit, where it picks up the heat generated by the fan motor, sensibly heating the air to 77° F. dry bulb, 57.4° F. wet bulb (Point G, FIG. 5), and this air is then discharged from the unit. Microprocessor 13 controls the operation of fan motor 42 based on time scheduling and dehumidification load in the room, and controls the speed of the fan with a variable-speed drive or fan cycling.

Referencing FIG. 1, outside and return air openings 12 and 120, respectively, may contain modulating dampers 206 and 208 with motorized actuators 210 and 212 that are controlled by microprocessor 13. Dampers 206 and 208 are driven closed by actuators 210 and 212 when signalled by microprocessor 13 when the system is not in use, preventing unwanted circulation of air through the system.

When system use is required, microprocessor 13 sends a signal to the outside 206 or return 208 air damper, respectively, to open based on room occupancy, opening the return air damper 208 when no outside air is required but dehumidification is needed, or bringing in outside air when the room is occupied.

Under special circumstances, a carbon dioxide sensor 240 located in the room being served senses the $CO_2$ level in the room and sends an analog signal to outside air damper actuator 210 and return air damper actuator 212 to modulate the amount of outside air being introduced into the room to maintain at room temperature so that no sensible cooling of the space is performed. This dehumidified air is then delivered to the space being controlled. Dewpoint sensor 46, located in the space being served, measures the dewpoint in the space and sends an analog signal to microprocessor controller 13, which starts, stops, and modulates the speed of compressor 20 in order to maintain a constant dewpoint in the space. This method of control maintains the desired humidity level in the space regardless of the space dry bulb temperature or the outside air ventilation cooling being performed by chilled water coil 16 (FIG. 1) or evaporator coil 21 (FIG. 2).

This dehumidified air, when delivered to the room at the rate of 20 cubic feet per minute (cfm) per person will provide 260 BTUs per hour of latent cooling in the room (the equivalent of the latent load of one person), thus removing the humidity put into the room by that person while performing no sensible cooling of the room. As an example, a typical office space occupied by 45 people requires 900 cfm of outside ventilation air that must be cooled to the room dew point and 11,700 BTUH of latent cooling to meet the humidity load. A 900 cfm unit of the present invention requires 15 gallons per minute (gpm) of chilled water at 48° F. entering temperature to cool the air to the room dew point, 1.1 kW of compressor energy and 0.7 kW fan energy to provide 21,870 BTUH total cooling and 12,200 BTUH of latent cooling for the space for an EER of 12.2.

It will be appreciated by those skilled in the art that this provides totally independent control of room humidity removal and of the outside air ventilation cooling from the cooling in the space provided by conventional air conditioning equipment In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. A system for controlling air ventilation cooling and dehumidification in a building space, the system having an upstream side and a downstream side and comprising:
    means for admitting air into the system, positioned at the upstream side of the system;
    means for cooling, positioned downstream of the air flow admitting means;
    means for channeling air flow from the air flow admitting means to the cooling means;
    a vapor compression cycle air conditioning means, comprising:
        an evaporator coil positioned downstream of the cooling means;
        a condenser coil in refrigerant communication with, and positioned downstream of, the evaporator coil;
        a refrigeration compressor; and
        a refrigerant circuit between the evaporator coil, the condenser coil, and the compressor;
    means for channeling air flow from the cooling means to the evaporator coil;
    means for channeling air flow from the evaporator coil to the condenser coil;
    heat exchanger means for heating air passing between the evaporator coil and the condenser coil;
    means for creating air flow through the system; and
    means for permitting air flow to exit the system and for directing existing air flow to the building space, positioned at the downstream side of the system.

2. The system recited in claim 1, wherein the heat exchanger means comprises a second heat exchanger means and the system further comprises:
    a first heat exchanger means, positioned downstream of the cooling means and upstream of the evaporator coil and in fluid communication with the second heat exchanger means; and wherein:

the means for channeling air flow from the cooling means to the evaporator coil comprises means for channeling air flow from the cooling means to the first heat exchanger means and means for channeling air flow from the first heat exchanger to the evaporator coil.

3. The system recited in claim 1, further comprising:
a first sensing means to sense temperature and humidity of air at the upstream end of the system;
a second sensing means to sense the temperature of the air downstream of the cooling means;
a third sensing means to sense the temperature and the humidity of the air downstream of the condenser coil;
a fourth sensing means to sense the temperature and humidity of the building space;
desired building space setting means; and
control means, in signal communication with the first, the second, the third, and the fourth sensing means, and with the setting means, the control means operating upon the means for cooling, the vapor compression cycle air conditioning means, and the means for creating air flow.

4. The system recited in claim 3, wherein the cooling means comprises a precooling coil.

5. The system recited in claim 4, wherein the precooling coil comprises a chilled water cooling coil having an inlet and an outlet and the cooling means further comprises a source of chilled water connected to the coil inlet and a draining means connected to the coil outlet, the draining means connected to the chilled water source to form a closed loop.

6. The system recited in claim 5, wherein the cooling means further comprises a control valve modulating the flow of chilled water into the cooling coil from the source of chilled water, and the control means operating upon the means for cooling comprises the control valve being controlled by the control means in response to a signal from the second sensing means.

7. The system recited in claim 3, wherein:
the evaporator coil comprises a first evaporator coil;
the condenser coil comprises a first condenser coil;
the refrigeration compressor comprises a first refrigeration compressor;
the refrigerant circuit comprises a first refrigerant circuit; and
the cooling means comprises:
a second evaporator coil;
a second condenser coil in refrigerant communication with, and positioned downstream of, the second evaporator coil;
a second refrigeration compressor; and
a second refrigerant circuit between the second evaporator coil, the second condenser coil, and the second compressor.

8. The system recited in claim 7, wherein the cooling means further comprises:
a thermal expansion valve, positioned at an inlet of the second evaporator coil; and wherein
the first compressor is under signal control of the control means in response to a signal from the second sensing means.

9. The system recited in claim 3, wherein:
the vapor compression cycle air conditioning means further comprises a thermal expansion valve positioned in the refrigerant circuit between the evaporator coil and the condenser coil; and
the refrigerant circuit further comprises:
a pressure-actuated hot gas bypass valve in a second path between the compressor and the evaporator coil; and
a suction accumulator positioned between the evaporator coil and the compressor.

10. The system recited in claim 9, further comprising compressor control means for controlling the compressor in response to a signal from the fourth sensing means.

11. The system recited in claim 3, further comprising a fifth sensing means, positioned in the space to be cooled and dehumidified, to sense the concentration of carbon dioxide, the fifth sensing means in signal communication with the control means.

12. The system recited in claim 11, wherein the control means modulates the outside and return air admitting means in response to the concentration of carbon dioxide sensed by the fifth sensing means.

13. The system recited in claim 1, wherein the means for admitting air into the system comprises means for admitting outside air and means for admitting air from the building space.

14. The system as recited in claim 1, wherein the means for channeling air flow form the air flow admitting means to the cooling means further comprises filter means.

15. The system recited in claim 2, wherein:
the first heat exchanger means comprises a finned tube fluid-to-fluid heat pipe cooling coil; and
the second heat exchanger means comprises a heat pipe reheat coil.

16. The system recited in claim 2, wherein:
the first heat exchanger means comprises a finned tube water-based coil runaround loop precooling coil;
the second heat exchanger means comprises a finned tube water-based coil runaround loop reheat coil in fluid communication with the precooling coil; and
a circulating pump in the fluid communication path between the precooling coil and the reheat coil.

17. The system recited in claim 1 wherein the heat exchanger means for heating air passing between the evaporator coil and the condenser coil comprises means for passing a heated refrigerant therethrough that is cooled during heat exchange with the heating of air passing between the evaporator coil and the condenser coil.

18. The system recited in claim 17 further comprising means for utilizing the cooled refrigerant from the heat exchanger means to increase the operating efficiency of the vapor compression cycle air conditioning means.

19. A system for controlling air ventilation cooling and dehumidification in a building space, the system having an upstream side and a downstream side and comprising:
means for admitting air into the system, positioned at the upstream side of the system;
a first means for cooling, positioned downstream of the air flow admitting means;
means for channeling air flow from the air flow admitting means to the first cooling means;
a vapor compression cycle air conditioning means positioned downstream of the first cooling means and comprising:
an evaporator coil positioned downstream of the first cooling means;
a condenser coil in refrigerant communication with the evaporator coil; and a refrigeration compressor in refrigerant communication with the evaporator coil and the condenser coil so that refrigerant passes from the evaporator coil to the compressor and then to the condenser coil;

means for channeling air flow from the first cooling means to the evaporator coil;

heating means positioned between the evaporator coil and the condenser coil for heating air passing from the evaporator coil to the condenser coil;

means for channeling air flow from the evaporator coil to the heating means;

means for channeling air flow from the heating means to the condenser coil;

means for creating air flow through the system;

means for permitting air flow to exit the system; and means for directing exiting air flow to the building space, positioned at the downstream side of the system.

20. A system for conditioning outside air for use in an occupied building space, the system comprising:

a system enclosure having an upstream end having an inlet for receiving outside air and a downstream end having an outlet for passing conditioned air out of the enclosure, the enclosure defining a closed path for air passing between the inlet and the outlet;

means for creating a flow of air along the closed path;

an evaporator coil in the air flow path for receiving and cooling passing air;

a condenser coil in the air flow path downstream of the evaporator coil for heating passing air;

means including a refrigerant circuit for moving refrigerant from the condenser coil to the evaporator coil and back to the condenser coil;

a heat exchanger positioned in the air flow path between the evaporator coil and the condenser coil for heating air cooled by the evaporator coil; and additional cooling means independent of the evaporator coil and positioned between the inlet and the outlet in the air flow path for permitting the system to achieve a desired output cooling level.

21. The system recited in claim 20 wherein the additional cooling means is positioned upstream from the evaporator coil.

22. A method of cooling and dehumidifying a building space, comprising:

determining a set temperature and humidity for the building space;

providing a control means;

relaying the set temperature and humidity to the control means;

providing means for admitting outside air into a cooling and dehumidifying system, positioned at the upstream end of the system;

sensing and relaying the outside air temperature and humidity the control means;

providing means for cooling;

channeling air flow from the air flow admitting means to the cooling means;

sensing and relaying the temperature of the air exiting the cooling means to the control means;

controlling the cooling means responsive to the control means;

providing a vapor compression cycle air conditioning means, comprising:

an evaporator coil, positioned downstream of the cooling means;

a condenser coil in refrigerant communication with, and positioned downstream of, the evaporator coil;

a refrigeration compressor; and a refrigerant circuit between the evaporator coil, the condenser coil, and the compressor;

channeling air flow from the cooling means to the evaporator coil and thence from the evaporator coil to the condenser coil;

heating the air passing between the evaporator coil and the condenser coil;

23. A system for conditioning outside air for use in an occupied building space, the system comprising:

a system enclosure having an upstream end with an inlet therein for receiving outside air and a downstream end with an outlet therein for passing conditioned air out of the enclosure, the enclosure defining a closed path for air passing between the inlet and the outlet;

means for creating a flow of air within the enclosure along the closed path;

a vapor compression cycle air conditioning subsystem within the enclosure including an evaporator coil in the airflow path for receiving and cooling passing air, a condenser coil in the airflow path downstream of the evaporator coil for heating passing air and means including a refrigerant circuit for moving refrigerant from the condenser coil to the evaporator coil and then back to the condenser coil; and a heat exchanger within the enclosure and positioned in the airflow path between the evaporator coil and the condenser coil for heating air cooled by the evaporator coil.

* * * * *